US009400894B1

(12) United States Patent
Telang

(10) Patent No.: US 9,400,894 B1
(45) Date of Patent: Jul. 26, 2016

(54) MANAGEMENT OF LOG FILES SUBJECT TO EDIT RESTRICTIONS THAT CAN UNDERGO MODIFICATIONS

(71) Applicant: GOOGLE INC., Mountain View, CA (US)

(72) Inventor: Nilesh Girish Telang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 14/452,001

(22) Filed: Aug. 5, 2014

(51) Int. Cl.
*G06F 17/30* (2006.01)
*G06F 21/62* (2013.01)
*G06F 21/64* (2013.01)

(52) U.S. Cl.
CPC ............ *G06F 21/6254* (2013.01); *G06F 21/64* (2013.01)

(58) Field of Classification Search
CPC .................................................. G06Q 10/067
USPC .......... 709/223, 224, 225, 238; 711/118, 202, 711/206
See application file for complete search history.

(56) References Cited

U.S. PATENT DOCUMENTS

| 7,424,543 | B2 * | 9/2008 | Rice, III | ............ | G06F 17/30194 348/734 |
| 2005/0097260 | A1 * | 5/2005 | McGovern | ............ | G06F 3/0623 711/100 |
| 2012/0117665 | A1 * | 5/2012 | Borden | ............. | G06F 17/30097 726/30 |
| 2014/0019426 | A1 * | 1/2014 | Palmer | ............. | G06F 17/30221 707/694 |

OTHER PUBLICATIONS

"Restrict Others from Editing your PDF File with Adobe Acrobat XI"—Adobe, Jun. 2012 http://www.adobe.com/content/dam/Adobe/en/products/acrobat/pdfs/adobe-acrobat-xi-restrict-editing-pdf-file-tutorial-ue.pdf.*
"Extracting Content Structure for Web Pages based on Visual Representation"—Cai et al, Pennsylvania State University, Oct. 2009 http://citeseerx.ist.psu.edu/viewdoc/download?doi=10.1.1.85.3169&rep=rep1&type=pdf.*

* cited by examiner

*Primary Examiner* — Randy Scott
(74) *Attorney, Agent, or Firm* — Honigman Miller Schwartz and Cohn LLP

(57) ABSTRACT

Systems and methods for applying edit restrictions, modifying a file subject to edit restrictions, and obtaining a modified file that is subject to edit restriction in the file's original form are disclosed. Restriction metadata files may be used to identify restrictions to which a particular file is subject and the content of the file that is subject to each restriction. Difference data files may contain the unmodified data that is subject to the edit restriction before any modification of the file is done so that the file may be re-created after modification.

10 Claims, 8 Drawing Sheets

RESTRICTION 1 (ID: R1)

File Create Date == June 24, 2014

| File | Create Date | Owner |
|---|---|---|
| File 1 | June 22, 2104 | User 1 |
| File 2 | June 24, 2014 | User 2 |
| File 3 | June 6, 2014 | User 3 |
| File 4 | June 24, 2014 | User 4 |

RESTRICTION 1 (ID: R1)

File Create Date == June 24, 2014

FIG. 1a

| File | Create Date | Owner |
|---|---|---|
| File 1 | June 22, 2104 | User 1 |
| File 2 | June 24, 2014 | User 2 |
| File 3 | June 6, 2014 | User 3 |
| File 4 | June 24, 2014 | User 4 |

FIG. 1b

| Hold_Metadata_File 1 | Hold_Metadata_File 2 | Hold_Metadata_File3 | Hold_Metadata_File4 |
|---|---|---|---|
| | F2-Hold-RESTRICTION_1 | | F4-Hold-RESTRICTION_1 |
| | | | F4-Hold-RESTRICTION_2 |

| Row Number | Column Id (2) | Column Id (3) |
|---|---|---|
| 3 | j | k |
| 4 | n | o |

FIG. 4a
1 Jan 2014

| Row Number | Column Id (4) |
|---|---|
| 2 | h |

FIG. 4b
2 Feb 2014

MUT_DIFF_01_01_2014
→ 1 Jan 2014 difference file

MUT_DIFF_02_02_2014
→ 2 Feb 2014 difference file

FIG. 4c

MANAGEMENT OF LOG FILES SUBJECT TO EDIT RESTRICTIONS THAT CAN UNDERGO MODIFICATIONS

BACKGROUND

Companies specializing in software products and services sometimes collect information regarding the usage of their products and services. This usage information may include user information such as names and email addresses, user device data, location data, cookies, and anonymous identifiers. Information may be collected in the form of server log files and analyzed to improve existing products and services as well as to develop new offerings.

For privacy concerns and regulatory requirements, usage log data undergoes an "anonymization" process which involves modifying certain fields in the log records to reduce the likelihood of identifying users through the log files. Modified fields may include users' IP addresses and cookies. Sometimes users request that their personal information be deleted entirely from the logs of a product or service. After receiving such a request, a product or service deletes all of the requesting user's information.

Additionally, companies may occasionally receive legal hold requests for placing server log data on a legal hold, meaning that the data identified by the legal hold is relevant for a pending litigation, audit, government investigation, or other legal matter. It is important for the identified data to maintain its integrity from the date the legal hold was applied. Therefore, data identified by a legal hold should not be deleted or modified for a date range for which the legal hold is valid. For example, the legal hold may start today and last for two months. The integrity of all data within the server logs that matches the criteria of the legal hold should be preserved for the specified time period of two months. In addition to legal hold requests, a company may proactively choose to retain certain log data for internal analysis.

However, as discussed above, server log data for products and services may be subject to modification. Since data on legal hold/proactive hold is not permitted to be modified or deleted, in customary systems, a separate physical copy of the data is created for the server log data that matches the legal hold/proactive hold criteria.

SUMMARY

One set of data may be accurately and completely held in its original form while the second set of data can be modified to anonymize the data and use it for product improvement and development. Creating a separate physical copy of server logs may cause a company to incur significant storage and maintenance costs because server logs may be very voluminous. There should be a way to manage legal holds, or other types of edit-restricted data, without requiring excessive storage in order to modify data subject to edit restrictions.

This specification describes technologies relating to storing data in general, and specifically to methods and systems for storing and managing updates to files that are subject to edit restrictions such as legal holds and/or proactive holds for legal cases.

In general, one aspect of the subject matter described in this specification can be embodied in a system, non-transitory computer-readable medium, and method for modifying a file subject to edit restrictions. A second aspect can be embodied in a system, non-transitory computer-readable medium, and method for applying an edit restriction to a file. A third aspect can be embodied in a system, non-transitory computer-readable medium, and method for obtaining a modified file that is subject to an edit restriction in the file's original form.

An example system includes one or more processing devices and one or more storage devices storing instructions that, when executed by the one or more processing devices cause the one or more processing devices to execute an example method. An example non-transitory computer-readable medium stores computer executable code that causes one or more processors to execute the steps of an example method.

An example method for modifying a file subject to edit restrictions includes: receiving a request to modify content of an original file that is subject to at least one edit restriction; reading a metadata file associated with the edit restriction of the original file to identify the contents of the original file subject to restriction; identifying, from the request to modify content of the original file, the original file content to be modified; determining the content of the original file to be modified as content of the original file that is both subject to restriction and content to be modified; prior to modification, creating at least one difference data file to store a copy of the content of the original file being modified; copying the content of the original file to be modified to the at least one difference data file; and modifying the original file as requested to obtain a modified file.

An example method for applying an edit restriction to a file includes: receiving restriction criteria associated with a particular edit restriction; iterating through files in a storage to identify at least one file that satisfies the restriction criteria; modifying file permissions for the at least one file that satisfies the restriction criteria so that the file is edit restricted; and creating a restriction metadata file to specify that the at least one file is subject to the edit restriction and to specify content of the file that is subject to edit restrictions.

An example method for obtaining a modified file that is subject to an edit restriction in the file's original form includes: receiving a request to obtain an original form of a restricted file at the time the restriction was applied when the restricted file was modified subsequent to the application of the edit restriction; opening the restricted file; obtaining a restriction metadata file associated with both the restricted file and the edit restriction; responsive to determining that the restriction metadata file is not empty, obtaining all difference data files associated with both the restricted file and the edit restriction; merging the difference data files associated with each modification of the restricted file into the restricted file in reverse sequence of modification until all difference data files have been merged into the restricted file; and providing the restricted file subsequent to merging all the difference data files into the restricted file.

These and other embodiments can optionally include one or more of the following features. One difference data file may be a protocol buffer, JSON, or XML file. A checksum may be calculated from the original file that is subject to at least one edit restriction prior to modification, after modification, the contents of the modified file may be merged with the at least one difference data file to obtain a resulting file, a checksum may be calculated for the resulting file, and the checksum for the original file may be compared with the checksum for the resulting file to determine that the resulting file's contents match the original file's contents. A difference data file may be protected using operating system level file permissions or encryption techniques. An edit restriction may be a legal hold or a proactive hold. An edit restriction may be released from a file by determining that a file edit restriction should be released, identifying all files subject to the edit restriction, deleting the difference data files for all files subject to the edit restriction, and modifying the file permissions for all files that are subject to no other restrictions so that the files may be modified in a standard manner. Determining that a file edit restriction should be released may occur on an end date of a date range for which the edit restriction is valid. For each difference data file associated with both a restricted file and an edit restriction, in order to obtain the file in original form, obtain a checksum stored with the difference data file, after the difference data file has been merged with the restricted file, obtain a checksum of the merged file, and compare the checksum of the merged file with the checksum stored with the difference data file to ensure that the checksums match. If the checksums do not match, an error in the merged files may be detected.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1a is a block diagram illustrating an example edit restriction.

FIG. 1b is an example file listing.

FIG. 1c is an example of restriction metadata.

FIG. 3a is an example of file contents.

FIG. 3b is an example of modifications that may occur to the file contents of the file represented in FIG. 3a.

FIG. 4a is an example difference data file.

FIG. 4b is an example difference data file.

FIG. 4c is an example directory structure.

DETAILED DESCRIPTION

As recognized by the inventors, there should be a method of storing and handling updates to data sets that are subject to edit restrictions, such as legal holds and/or proactive holds for legal cases, which does not require excessive storage. An embodiment may provide methods for applying at least one edit restriction to a file or set of files, modifying a file subject to an edit restriction, releasing an edit restriction, displaying a file in its original form when the file was modified subsequent to a restriction application, and/or verifying the contents of a file that has been subject to at least one edit restriction, but that has been subsequently modified.

Applying an Edit Restriction

Figure 5A:
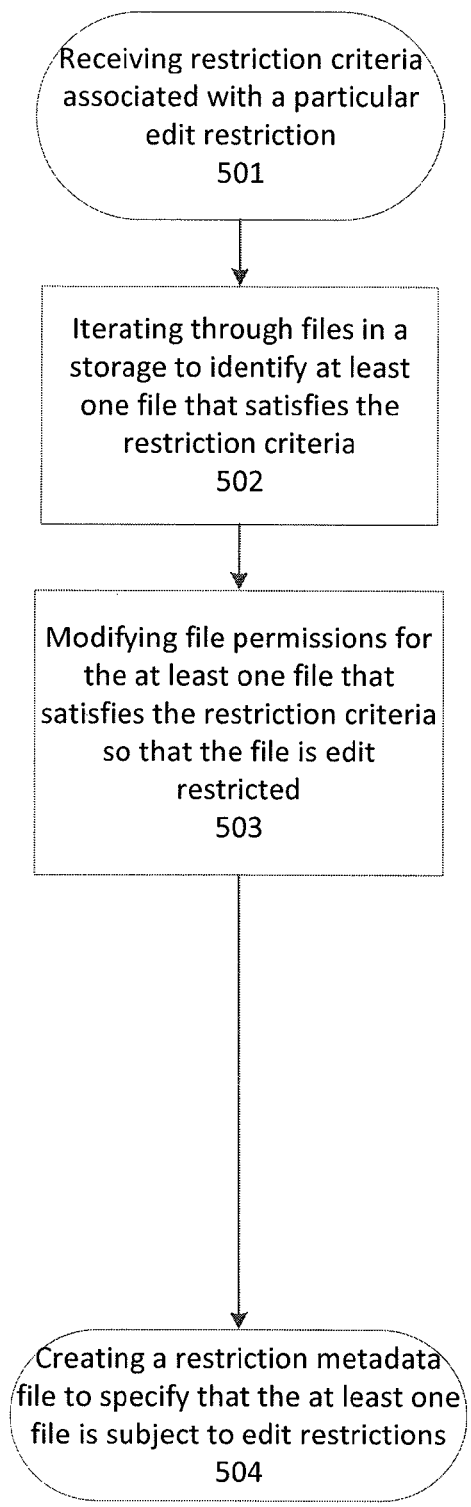
FIG. 5a is flow diagram illustrating an example method of applying an edit restriction to a particular file.

To apply an edit restriction to a file or set of files, an example embodiment may receive or identify restriction criteria which may be associated with the restriction and used to determine whether a file is subject to edit restrictions as illustrated in FIG. 5a (501). Restriction criteria may include: files created or modified on a specified date (or within a specified date range); files owned by a specified user or user group; files created by a specified user or user group; files containing specified content; files in a specified directory and/or files of a certain size. Furthermore, restriction criterion may include specifying other characteristics and/or content associated with a file.

The restriction criteria may be associated with a restriction identifier which is a unique identifier with which the current restriction can be identified. As illustrated in FIG. 1a, an edit restriction, RESTRICTION 1, may contain criteria that specifies that all files created on Jun. 24, 2014 are subject to edit restriction.

When applying an edit restriction, an example method may iterate through files in a directory or file storage and identifying files that satisfy the edit restriction's criteria (502). For example as illustrated in FIG. 1b, as the example method iterates through a file directory, a file listing, or file storage, the method may identify all files subject to edit restrictions of the specified restriction. If the file listing of FIG. 1b is subject to the restriction criteria of FIG. 1a, RESTRICTION 1, all files created on Jun. 24, 2014 should be edit restricted. Therefore, when iterating through the file listing illustrated in FIG. 1b, Files 2 and 4 would be identified to be subject to edit restriction by RESTRICTION 1.

For each identified file, the file permissions may be modified so that the file may only be updated by a specific user or group of users or a specific service, such as a legal hold service (503). Additionally, a restriction metadata file may be created for the file to specify whether the file is subject to an edit restriction and the content that is subject to edit restrictions (504). As illustrated in FIG. 1c, in some embodiments restriction metadata (Hold Metadata) files may be created for all files. In other embodiments, restriction metadata files may only be created for files subject to an edit restriction. Since one file may be subject to several edit restrictions, each restriction to which a file is subject may be specified in the file's restriction metadata file.

As illustrated in FIG. 1c, File 2's restriction metadata file, Hold Metadata File2, may identify the presence of file, F2-Hold-RESTRICTION_1, which signifies that File 2 is subject to RESTRICTION 1. File 1's restriction metadata file and File 3's restriction metadata file are both empty signifying that File 1 and File 3 are not subject to any restrictions. File 4's restriction metadata file identifies the presence of two files, F4-Hold-RESTRICTION_1 and F4-Hold-RESTRICTION_2, which signifies that File 4 is subject to RESTRICTION 1 and a second restriction, RESTRICTION 2.

Figure 2B:
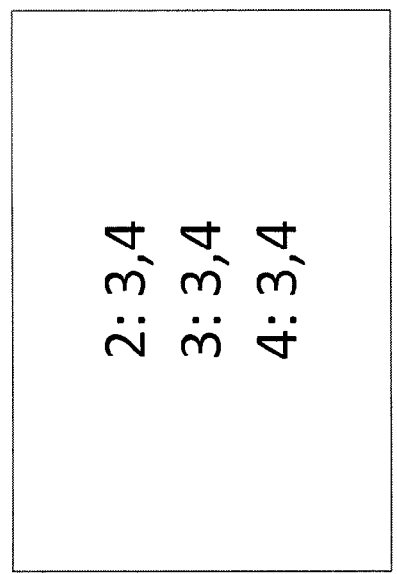
FIG. 2b is an example of an empty restriction metadata file.
Figure 2A:
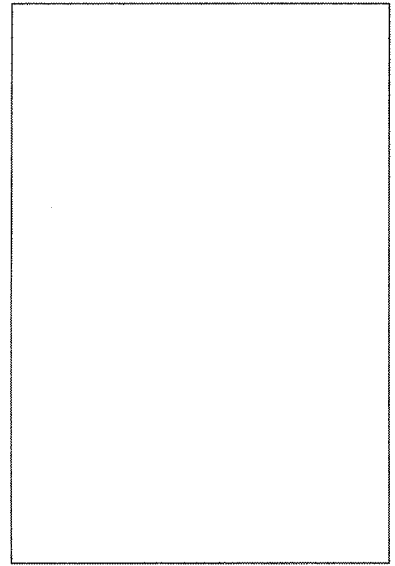
FIG. 2a is an example of a granular restriction metadata file.

Each restriction may also have an associated metadata file per file for which the restriction applies. This restriction metadata file may further include granular information to help identify a subset of data in the file (e.g. rows and/or columns) that is subject to edit restriction. If a restriction's metadata file is empty, the entire contents of the original file may be subject to the restriction. For example, File 2's RESTRICTION 1 file may specify that rows 2-4 and columns 3 and 4 are subject to edit restrictions, as illustrated in FIG. 2a. File 4's RESTRICTION 1 file may be empty, as shown in FIG. 2b, meaning that the entire contents of File 4 are subject to edit restrictions. In some embodiments, rather than store detailed row/column information in each restriction's metadata file, the restriction criteria may be persisted in a central location. Then, the detailed row/column information may be derived at runtime. This approach may transfer storage costs to the central processing unit (CPU) and may be good for files that are not modified multiple times (or are modified highly infrequently).

The edit restriction may be valid from the date on which the restriction was applied to the data and remain valid until the end of an edit-restriction period, such as a legal hold period. The edit-restriction period may additionally or alternatively removed by explicitly releasing the edit restriction as discussed below.

Modifying a File Subject to an Edit Restriction

Figure 5B:
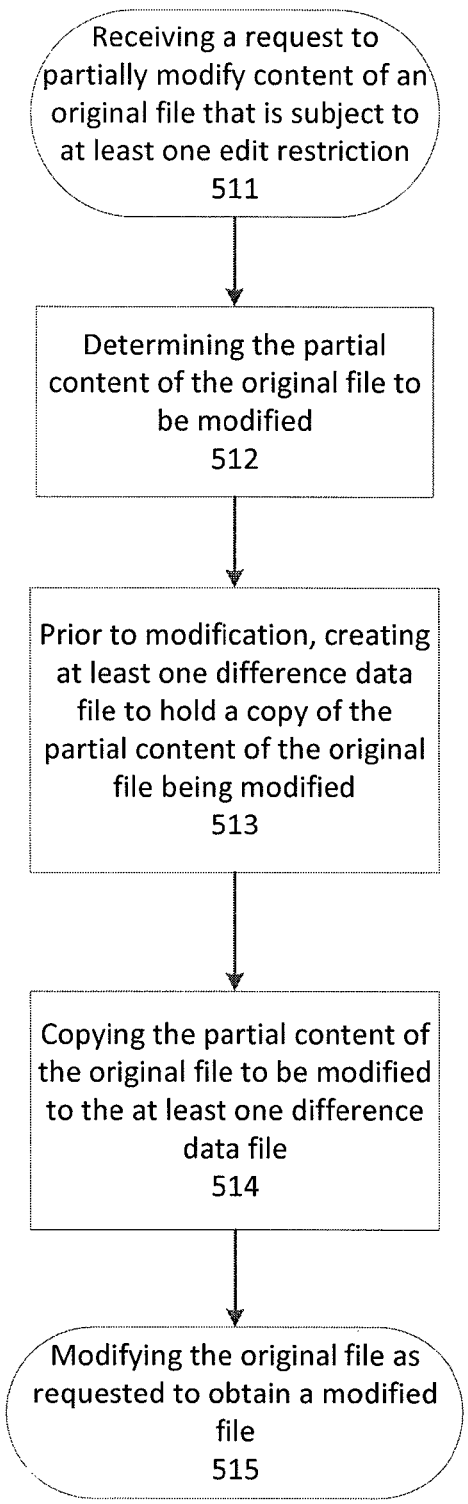
FIG. 5b is a flow diagram illustrating an example method for modifying the content of file that is subject to at least one edit restriction.

In an example embodiment, when a request is received to modify a file, an example method may first determine whether the file is subject an edit restriction by reading the file's corresponding restriction (or hold) metadata file as illustrated in FIG. 5b (511). As discussed above, if a file does not have an associated restriction metadata file or if the file's associated restriction metadata file is empty, the file is not subject to an edit restriction and can be modified as required. However, a file's restriction metadata file may include a reference to a restriction's metadata file. If the restriction's metadata file is empty, then the entire contents of the original file may be subject to the restriction.

As illustrated in FIG. 1c, both File 1 and File 3's restriction metadata files are empty and therefore these files may be modified in a normal manner. However, both File 2 and File 4 have restrictions specified in their restriction (hold) metadata files. An example method may also determine the content (or partial content) of the file to be modified (512). When modifying a file that is subject to an edit restriction, an example method may create a file or set of files (restriction difference files) containing the unmodified data that is subject to the edit restriction before any modification of the original file is done so that the original file may be re-created after modification (513).

For example, as illustrated in FIG. 2a, the restriction metadata file shows that only rows 2-4 and columns 3 and 4 are subject to edit restriction. In the example discussed above, this restriction metadata file may be the restriction metadata file for File 2. Therefore, only these rows and columns of File 2 need to be re-created in a difference file or set of difference files. FIG. 2b shows an empty restriction metadata file which means that the entire contents of File 4 are subject to an edit restriction. Therefore, the entire contents of File 4 need to be re-created in a difference file or set of difference files.

Figures 3A, 3B:
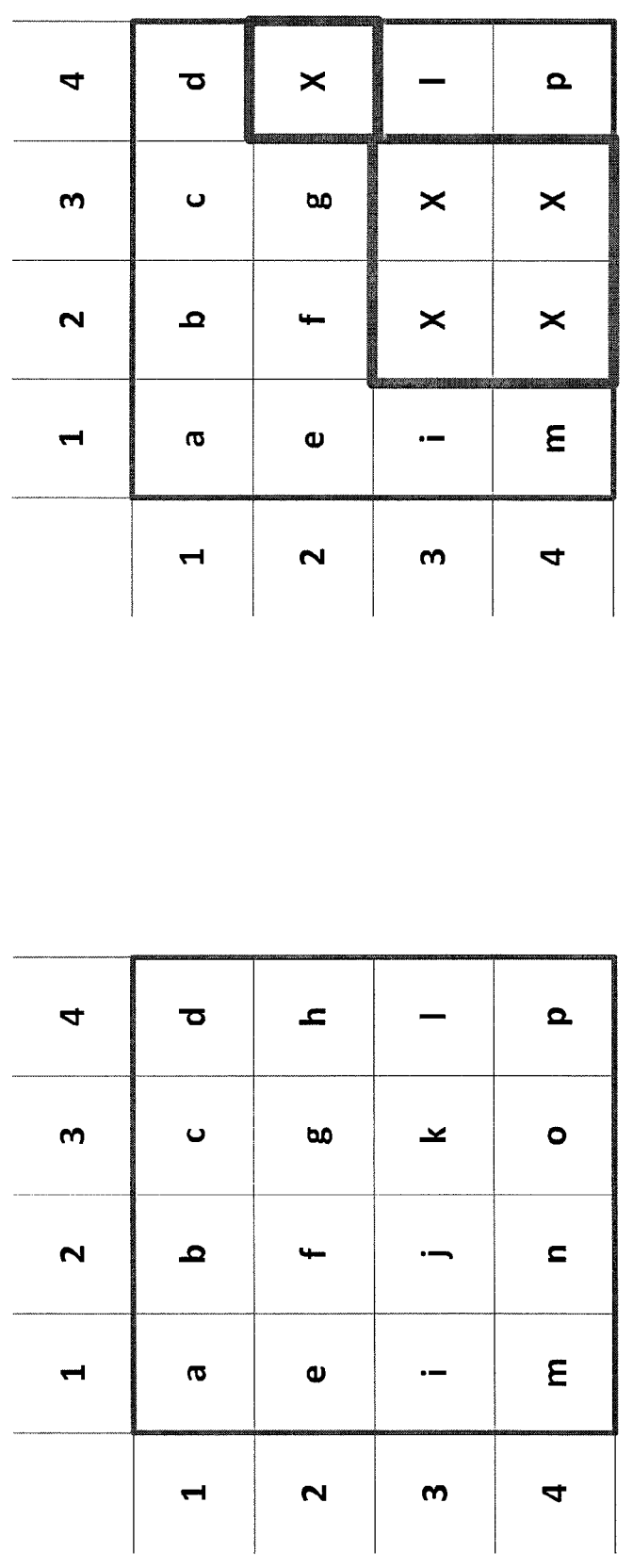

FIG. 3a may be an example of the contents of File 2 and FIG. 3b may be the anonymization modification that should be made to File 2. As shown, row 2, column 4 should be modified as well as columns 2 and 3 of rows 3 and 4. Difference files may be created to store the pre-modified version of only those datacells that are modified as part of the file modification process. Therefore, difference files may be needed for the data cell of row 2, column 4 and columns 2 and 3 of rows 3 and 4. A single file may be maintained for all rows where the same columns have been modified. In an example embodiment, files may be stored in protocol buffers. Therefore, these files have a row/column format. Since these files have a row/column format, an example embodiment may be able to specify granular entities of a file that should not be modified, identify granular entities of the file that will be modified during a mutation, and/or store pre-mutation versions of granular entities.

As illustrated in FIG. 4a, one difference data file (HOLD-DIFFDATA_F2_1) may be created for rows 3 and 4 since columns 2 and 3 are modified from FIG. 3a to FIG. 3b for both rows. A second difference data file (HOLD-DIFF-DATA_F2_2) may be created for row 2 since column 4 is modified for that row. The content to be modified may be copied to the difference data file or files prior to modification (514). Once the content is copied, the file may be modified as requested by a user or service (515).

In one embodiment, the difference data files may be persisted protocol buffers where the protocol buffer messages are created dynamically. Alternatively, or additionally, difference data files may be JSON or XML files. When a modification to a file is very large, an example method may decide between creating a difference data file or set of data files and copying the entire file.

An example embodiment may provide a method for updating or modifying a file since a file subject to edit restriction may only be modified by certain users. This method may have edit access to edit-restricted files and may optionally validate created difference data files before modifying a requested file. Each restriction may have its own list of difference data files since each restriction may define a different portion of a file to be subject to edit restrictions. If only a full file, and not a subset of the file, is subject to edit restrictions, difference data files will be the same for all restrictions for a particular file. The created difference data files may be associated with the restriction metadata file for the file being modified so that both files may be used to re-create the original file if necessary.

In an example embodiment, when an example method is updating a file subject to edit restrictions, the example method may calculate a checksum of the original file prior to modification. The method may then perform modifications using difference data files to hold the original contents of the file. The method may then merge the contents of the modified file with the difference data files and ensure that the checksum of the resulting file matches the original file checksum. If the checksums do not match, there may be a failure. If the checksums do match, the method may update the original file to the updated file. For every difference data file associated with the original file subject to a particular restriction, a directory may be created that holds a list of the difference data files for the original file subject to the particular restriction. This directory may be named by identifying the restriction identifier along with a timestamp and file name to make it easy to determine with which file and restriction the difference data files are associated. The original file checksum may also be included in the directory. This process makes it possible to identify the difference data files for every unique modification, on a file, per restriction as well as the sequence in which the unique modifications were performed.

Releasing an Edit Restriction

To release a particular restriction, an example embodiment may begin by identifying all files subject to the restriction. For all files where the restriction metadata exists for the particular restriction, if there is any difference data, an example method may delete the difference data. The method may then delete the restriction metadata from the identified files. If a file is subject to no other restrictions, then the file permissions may be changed so that the file can be modified regularly.

In some embodiments, there may be an interface that allows users to read, view, or otherwise obtain the content of edit restricted files as it existed at the time the edit restriction was applied, such as in the context of a legal case. This interface may display edit restricted files in their original form prior to any modifications that occurred subsequent to the application of the edit restriction.

Edit restrictions may be released explicitly by user interaction in some embodiments. In other embodiments, an edit restriction may expire and automatically be released on an end date of a date range for which the edit restriction is valid.

Figure 5C:
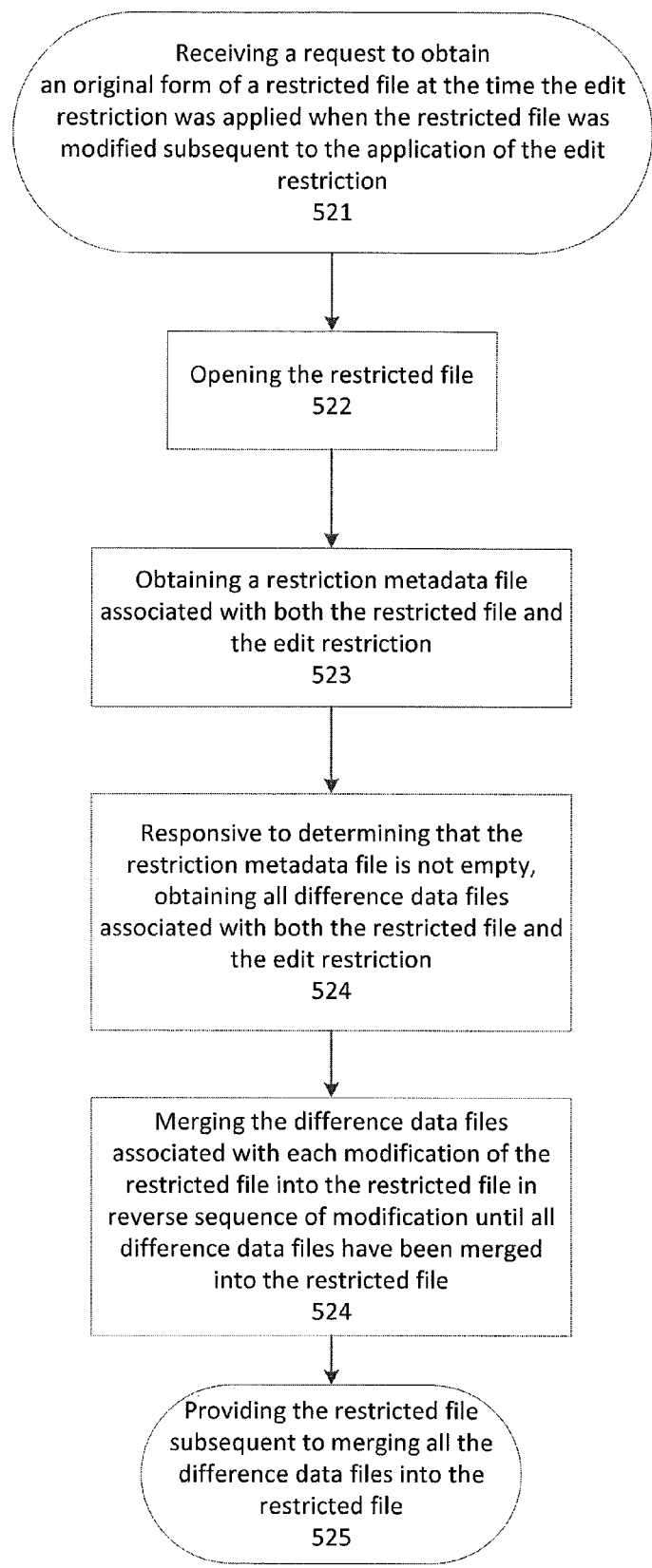
FIG. 5c is a flow diagram illustrating an example method for providing a restricted file.

Displaying a File in its Original Form when the File was Modified Subsequent to a Restriction Application Opening a Restricted File that was Modified Subsequent to Restriction As illustrated in FIG. 5c, a request may be received to obtain an original form of a restricted file at the time the edit restriction was applied when the restricted file was modified subsequent to the application of the edit restriction (521). In order to read a file that is subject to edit restriction in the file's original form at the date on which the restriction was applied, an example method may receive or identify the file that should be obtained as well as the particular restriction that was applied to the file. The file may be opened in read mode (522) and the contents may be read. In an example embodiment, an operating system file descriptor may be used to read the contents of a particular file. The restriction metadata file associated with the restricted file and the edit restriction may be obtained (523). If the file's restriction metadata file is not empty for the specified restriction, an example method may find all the associated difference data files/directories for that restriction and arrange the differences in the reverse sequence of modifications (524). The file contents should be displayed as they existed on the date that the restriction was applied to the file.

For example, a file may undergo mutation on 1 Jan. 2014. For this mutation, an example embodiment may create mutation difference files under a specific directory, such as MUT_DIFF_01_01_2014 as illustrated in FIG. 4c. FIG. 4a may be a difference data file from 1 Jan. 2014 for the original file as illustrated in FIG. 3a stored in directory MUT_DIFF_01_01_2014.

The file may undergo an additional mutation on 2 Feb. 2014. For this mutation, an example embodiment may create mutation difference files under a second specific directory, such as MUT_DIFF_02_02_2014 as illustrated in FIG. 4c. FIG. 4b may be a difference data file from 2 Feb. 2014 for the file stored in directory MUT_DIFF_02_02_2014. When the difference data files are arranged to recreate FIG. 3a, FIG. 4b may be applied before FIG. 4a. Thus, the directories may be listed in reverse order of creation: *MUT_DIFF_02_02_2014, *MUT_DIFF_01_01_2014. The newest modification should be listed first and the modifications should appear in order, listing all modifications to the oldest. The timestamp in the directory name may be used to identify the sequence of file modifications. An example method may then iterate over the difference data files. For every difference data file in each directory, the difference file may be opened in read mode and the operating system file descriptor for the file, which comes from the operating system and enables access to the file contents, may be appended to a list of operating system level file descriptors identifying the difference data files to be merged into the current file in order to recreate the contents of the file as they were the day the restriction was applied. Then an operating system level file descriptor for the file should be returned which includes the list of OS level file descriptors of the difference files that should be merged into the file. Although an example embodiment uses operating system level file descriptors, any number of other pieces of information may be used to identify the difference data files that should be merged, and the order in which to merge the files, into the current file in order to recreate the file contents as they were the day the restriction was applied.

Reading a Restricted File that was Modified Subsequent to Restriction

Once the file is opened, an example method may try to read each line of a restricted file that was modified subsequent to restriction. An example read method begins with receiving a request to read a file and then attempting to read the next line from the file. If the file is empty or there are no more lines in the file, the method may terminate. If the next line is read successfully, the contents of the line may be stored in memory such as RAM. The line may be identified as the current file record and may have a current file record number. For each file descriptor in the difference data directory listing (described above), data may be merged in reverse sequence to modification as long as there are more records in the difference data directory and if the record number for the difference data file matches the current file record number (524). For example, iterating over the file as illustrated in FIGS. 3a and 3b, line 1 has no difference files associated with it. However, there are diff files for lines 2, 3, and 4. An example method begins iterating over the file at line 1, then moves to line 2. The entry for line two, as illustrated in FIG. 4b, is found and a merge may be performed. Then, an example method moves to line 3 and merges the changes from FIG. 4a and finally repeats this process with line 4. The line numbers are matched with difference file data. The merged record may then be copied to the output and provided to the requesting user or service (525).

Closing a Restricted File that was Modified Subsequent to Restriction

To close a restricted file, all file descriptors in the difference data file directory list may be closed along with the output file that contains all the merged differences.

Verifying the Contents of a Restricted File that was Modified Subsequent to Restriction To verify that the contents of a restricted file are valid, an example method may merge the requested file with subsequent changes in the reverse order as discussed above. As difference files are added to the requested file, the checksum of the merged file may be calculated and compared with the checksum file stored in the difference data file directory. Once the difference files in a specific directory have been added to the requested file, the checksum of the directory should match the checksum of the merged file. If the checksums do not match, there may be an error.

Difference data files may need to be protected from unauthorized access in order to ensure their data integrity. This protection may occur by using OS level file permissions and/or encryption techniques. One form of encryption may be to encrypt the data so that only the example method is aware of the key to decrypt the data. Deletion of records and/or complete files may be treated similarly to modification of records.

Figure 6:
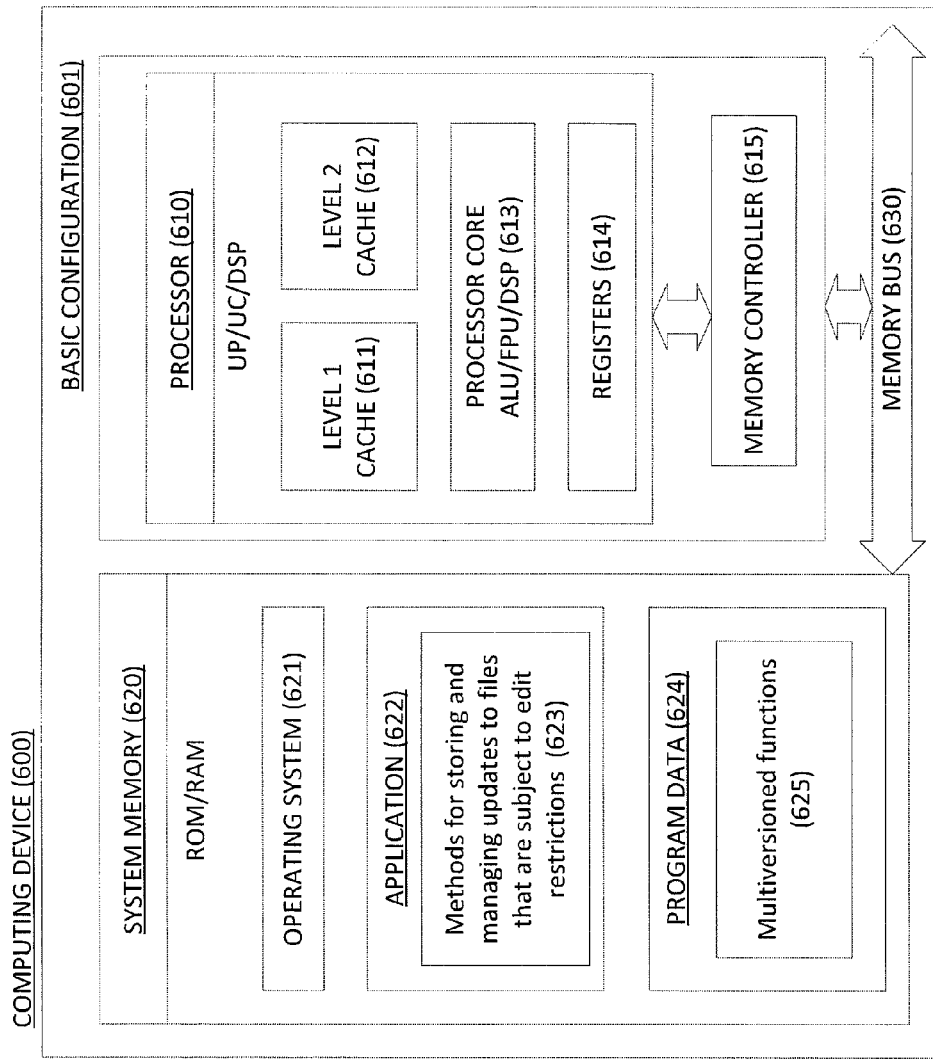
FIG. 6 is a block diagram illustrating an exemplary computing device.

FIG. 6 is a high-level block diagram of an example computer (600) that is arranged for storing and managing updates to files that are subject to edit restrictions. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a method for modifying an edit restricted file, applying an edit restriction to a file, or obtaining a file subject to edit restrictions as the file existed prior to application of the edit restriction. Program Data (624) includes storing instructions that, when executed by the one or more processing devices, implement a system and method for storing and managing updates to files that are subject to edit restrictions. (623). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for modifying a file subject to edit restrictions, the method comprising:
   receiving a request to modify content of an original file that is subject to at least one edit restriction;
   reading a metadata file associated with the edit restriction of the original file to identify the contents of the original file subject to restriction;
   identifying, from the request to modify content of the original file, the original file content to be modified;
   determining the content of the original file to be modified as content of the original file that is both subject to restriction and content to be modified;
   prior to modification, creating at least one difference data file to store a copy of the content of the original file being modified;
   copying the content of the original file to be modified to the at least one difference data file; and
   modifying the original file as requested to obtain a modified file.

2. The method of claim 1 wherein the at least one difference data file is a protocol buffer, JSON, or XML file.

3. The method of claim 1 further comprising:
   calculating a checksum for the original file that is subject to at least one edit restriction prior to modification;
   after modification, merging the contents of the modified file with the at least one difference data file to obtain a resulting file;
   calculating a checksum for the resulting file; and
   comparing the checksum for the original file with the checksum for the resulting file to determine that the resulting file's contents match the original file's contents.

4. The method of claim 1, further comprising:
   protecting the difference data file using operating system level file permissions or encryption techniques.

5. The method of claim 1, wherein an edit restriction is a legal hold or a proactive hold.

6. A method for applying an edit restriction to a file, the method comprising:
   receiving restriction criteria associated with a particular edit restriction;

iterating through files in a storage to identify at least one file that satisfies the restriction criteria;
modifying file permissions for the at least one file that satisfies the restriction criteria so that the file is edit restricted;
creating a restriction metadata file to specify that the at least one file is subject to the edit restriction and to specify content of the file that is subject to edit restrictions; and
modifying the at least one file by:
  receiving a request to modify content of the at least one file that is subject to at least one edit restriction;
  determining the content of the at least one file to be modified;
  prior to modification, creating at least one difference data file to hold a copy of the content of the at least one file being modified;
  copying the content of the at least one file to be modified to the at least one difference data file; and
  modifying the at least one file as requested to obtain a modified file.

7. The method of claim 6, wherein an edit restriction is a legal hold or a proactive hold.

8. The method of claim 6, further comprising:
protecting the difference data file using operating system level file permissions or encryption techniques.

9. A method for applying an edit restriction to a file, the method comprising:
  receiving restriction criteria associated with a particular edit restriction;
  iterating through files in a storage to identify at least one file that satisfies the restriction criteria;
  modifying file permissions for the at least one file that satisfies the restriction criteria so that the file is edit restricted;
  creating a restriction metadata file to specify that the at least one file is subject to the edit restriction and to specify content of the file that is subject to edit restrictions; and
  releasing the restriction from the at least one file by:
    determining that a file edit restriction should be released;
    identifying all files subject to the edit restriction;
    deleting the difference data files for all files subject to the edit restriction; and
    modifying the file permissions for all files that are subject to no other restrictions so that the files may be modified in a standard manner.

10. The method of claim 9, wherein determining that a file edit restriction should be released occurs on an end date of a date range for which the edit restriction is valid.

* * * * *